(12) United States Patent
Koelmeyer

(10) Patent No.: US 9,707,995 B2
(45) Date of Patent: Jul. 18, 2017

(54) PISTON ASSEMBLY

(71) Applicant: Ticbar Pty Ltd., Rydalmere, New South Wales (AU)

(72) Inventor: Lucian Kenneth Clive Koelmeyer, Dandenong (AU)

(73) Assignee: Ticbar Pty Ltd, Rydalmere, NSW (AU)

(*) Notice: Subject to any disclaimer, the term of this patent is extended or adjusted under 35 U.S.C. 154(b) by 160 days.

(21) Appl. No.: 14/843,203

(22) Filed: Sep. 2, 2015

(65) Prior Publication Data

US 2016/0325778 A1  Nov. 10, 2016

(30) Foreign Application Priority Data

May 6, 2015 (AU) ................... 2015901616

(51) Int. Cl.
*F16J 1/12* (2006.01)
*B62D 5/22* (2006.01)
*F16J 1/10* (2006.01)

(52) U.S. Cl.
CPC ...... *B62D 5/22* (2013.01); *F16J 1/10* (2013.01); *F16J 1/12* (2013.01)

(58) Field of Classification Search
CPC ............... F16J 1/10; F16J 1/12; B62D 5/12
USPC ............................................. 92/255
See application file for complete search history.

(56) References Cited

U.S. PATENT DOCUMENTS

| | | | | |
|---|---|---|---|---|
| 3,636,824 A * | 1/1972 | Clark | ........... | F16J 1/006 92/258 |
| 3,807,285 A * | 4/1974 | Phillips | ........... | F16J 1/12 92/255 |
| 4,815,360 A * | 3/1989 | Winterle | ........... | F16J 1/12 92/255 |
| 7,063,004 B1 * | 6/2006 | Kabir | ........... | F16J 1/12 92/255 |

* cited by examiner

*Primary Examiner* — Michael Leslie
(74) *Attorney, Agent, or Firm* — Wood Herron & Evans LLP

(57) ABSTRACT

A steering rack piston assembly (10) employed in a power steering rack and piston assembly. The assembly includes a shaft (bar) (11) upon which there is mounted a piston (12). The shaft (11) has a longitudinal axis (13), that is also the longitudinal axis of the piston (12). The piston (12) has an outer groove (15) that receives a seal (16) that slidably engages in a cylindrical surface of an outer housing that is not illustrated. The piston (12) and shaft (11) move along the axis (13) relative to the outer housing as a result of pressure within the fluid located on opposite sides of the piston (12).

12 Claims, 2 Drawing Sheets

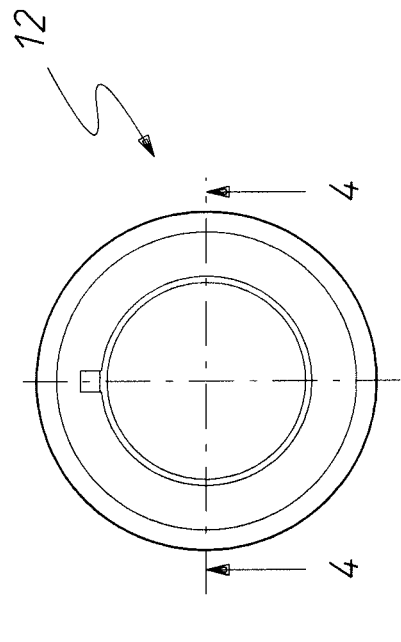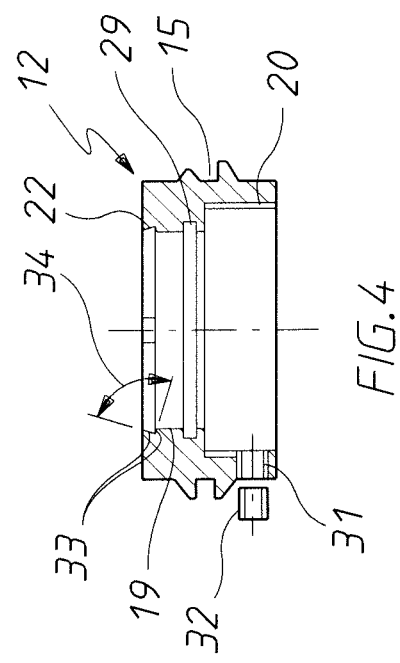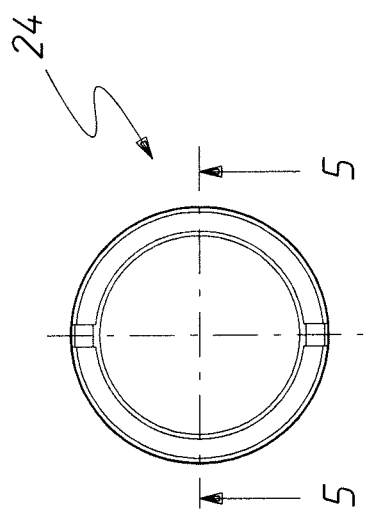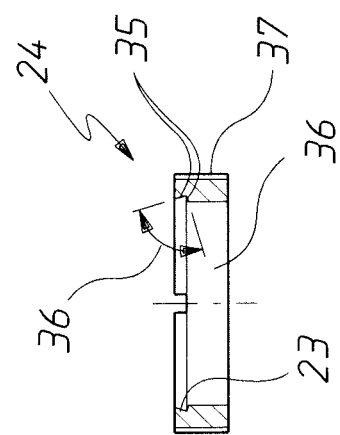

PISTON ASSEMBLY

FIELD

The present invention relates to piston and shaft assemblies and more particularly but not exclusively to such an assembly employed in a rack and pinion power steering assembly.

BACKGROUND

In the power steering unit of automobiles, a steering rack and pinion are used with a rack housing. Inside the rack housing there is a shaft commonly referred to as the "bar". Located on the bar is metal bushings that separate the two pools of hydraulic steering liquid located in the rack housing. This bushing is often referred to as the "piston". The bar has end seals, that are replaced when the rack is reconditioned. Normally the seals can be simply removed and replaced, however where the bar has a larger end diameter, the piston must be removed to gain access to all the seals.

A number of methods are employed to secure the piston to the shaft. One method is crimping, while the other method employs a wire that is inserted in the bar and wrapped around the piston. These two methods of securing the piston to the shaft have a number of disadvantages, including difficulty in respect of removing the piston, while frequently allowing movement of the piston on shaft during operation.

OBJECT

It is the object of the present invention to overcome or substantially ameliorate at least one of the above disadvantages.

SUMMARY OF INVENTION

There is disclosed herein an assembly including:

a shaft having a longitudinal axis, a circular transverse cross-section, and having a longitudinal extending outer peripheral surface;

a piston having a longitudinal through passage, through which the shaft passes, so as to have an internal surface surrounding the shaft, the internal surface being stepped so as to have a first length adjacent the shaft and a second longitudinal length spaced from the shaft, the second longitudinal length being threaded;

a nut, through which the shaft extends, threadingly engaged with the second longitudinal length; and wherein the first shaft length and the shaft have adjacent annular grooves, and the nut and the shaft have adjacent angular grooves, with the assembly including a first clip in the adjacent grooves of the first length and shaft, and a resilient clip in the adjacent grooves of the nut and the shaft, the clips aiding in retaining the shaft fixed to the piston.

Preferably, the assembly includes a seal extending between the first length and shaft.

Preferably, the clips are spring clips.

Preferably, a threaded member engages the nut and piston to prevent relative movement therebetween.

Preferably, the piston has an outer annular groove to receive a seal to engage an outer cylindrical surface.

Preferably, the above assembly is employed in a steering rack.

BRIEF DESCRIPTION OF DRAWINGS

Preferred forms of the present invention will now be described by way of example with reference to the accompanying drawings wherein:

FIG. 2 is a schematic end elevation of the piston of FIG. 1;

FIG. 3 is a schematic end elevation of a nut used to engage the piston of FIG. 2;

FIG. 4 is the schematic sectioned side elevation of the piston of FIG. 2 sectioned along the line 4-4; and FIG. 5 is a schematic sectioned side elevation of the nut of FIG. 3 sectioned along the line 5-5.

DESCRIPTION OF EMBODIMENTS

Figure 1:
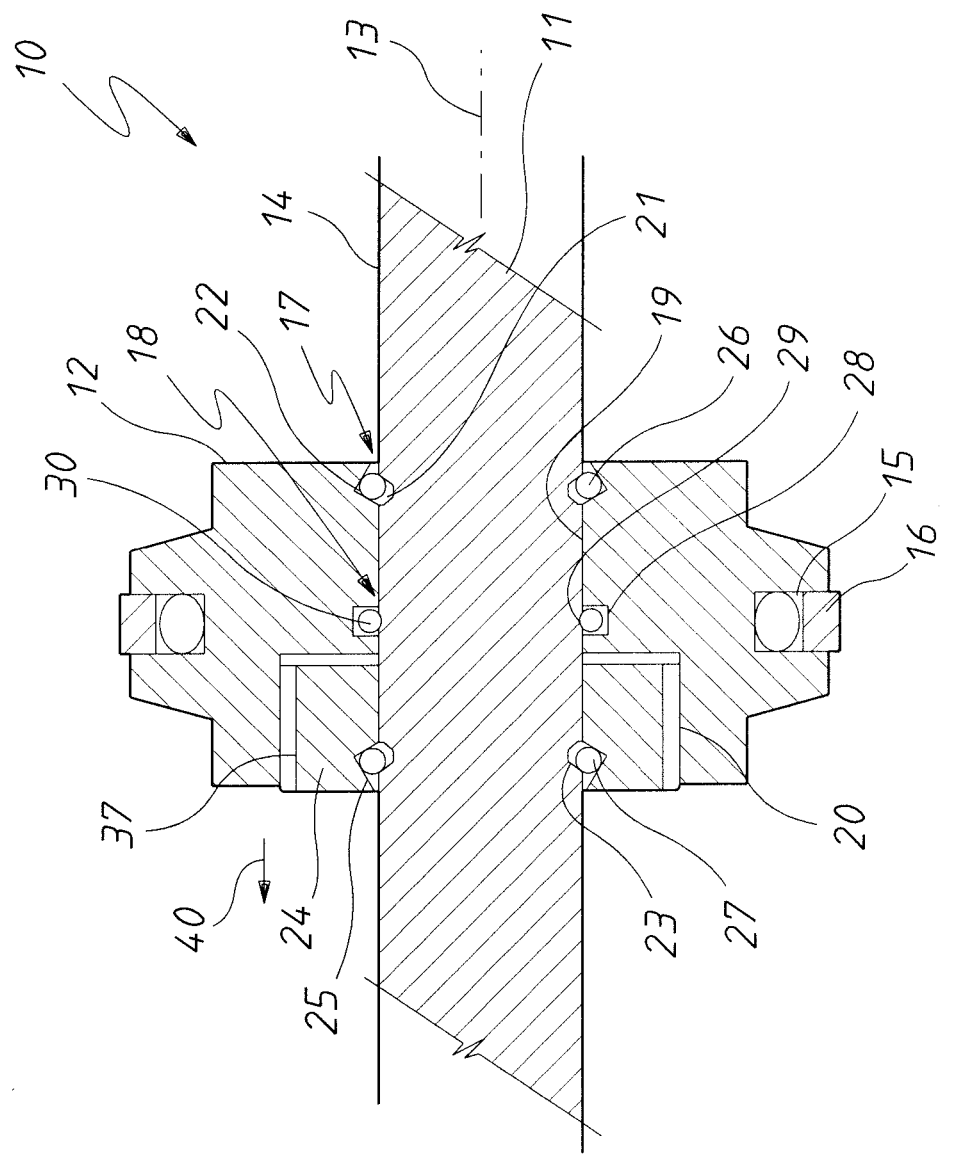
FIG. 1 is a schematic sectioned side elevation of a piston and shaft assembly.

In the accompanying drawings there is schematically depicted a steering rack piston assembly 10 employed in a power steering rack and pinion assembly. The assembly includes a shaft (bar) 11 upon which there is mounted a piston 12. The shaft 11 has a longitudinal axis 13, that is also the longitudinal axis of the piston 12.

The shaft 11 is circular in transverse cross-section and has a longitudinal outer peripheral surface 14 that in this embodiment is cylindrical.

The piston 12 has an outer annular groove 15 that receives a seal 16 that slidingly engages a cylindrical surface of an outer housing (not illustrated). The piston 12 and shaft 11 moves along the axis 13 relative to the outer housing as a result of pressure within fluid located on opposite sides of the piston 12.

The piston 12 has a through passage 17, of circular transverse cross-section, so as to have an internal surface 18.

The surface 18 is stepped so as to provide a first longitudinal length 19 and a second longitudinal length 20, the length 20 having a radius greater than the length 19 with respect to the axis 13. The longitudinal length 19 of the surface 18 is located adjacent the shaft 11, while the second longitudinal length 20 of the surface 18 is spaced from the shaft 11.

The surface 20 is threaded.

The surface 14 has an annular groove 21 while the piston 12 has an annular groove 22 adjacent the groove 21.

The surface 14 has a second annular groove 23 spaced along the axis 13 from the groove 21.

A nut 24 is engaged on the shaft 11 by having an externally threaded portion 37 that threadably engaged with the length 20. The nut 24 has a longitudinal passage 36 through which the shaft 11 extends. The nut 24 is circular in configuration and is located between the piston 12 and the shaft 11, and is provided with an annular groove 25. The groove 25 is located adjacent the groove 23.

Located in the adjacent grooves 21 and 22 is a resilient clip 26. Located in the adjacent grooves 23 and 25 is a resilient clip 27. Preferably the clips 26 and 27 are spring clips and are resiliently deformable allowing assembly and dismantling of the piston 12 and nut 24 with respect to the shaft 11.

The piston 12 has a third annular groove 28 that is placed adjacent the shaft 11, with the grooves 28 receiving an O-ring 30 that sealingly connects the piston 12 with the shaft 11.

As mentioned above, the clips 26 and 27 can be resilient deformed to allow assembly and disassembly. When assembling the piston 12 with respect to the shaft 11, the O-ring 30 is placed in the groove 28 and the piston 12 engaged with the shaft 11, the piston 12 moves along the shaft 11, taking with it the O-ring 30. The O-ring 30 is partially compressed to provide for good sealing contact between the piston 12 and shaft 11.

Once the above is completed, the clips 26 and 27 are resilient deformed and inserted. For example, the clip 26 is resilient deformed and moved between the piston 12 and shaft 11 until it is located in the grooves 21 and 22 so as to then extend between the piston 12 and shaft 11. Similarly, the clip 27 is resiliently deformed and moves between the shaft 11 and nut 24 until it is located in the grooves 23 and 25 so as to extend between the shaft 11 and nut 24.

The clips 26 and 27 aid in retaining the piston 12 in correct position on the shaft 11.

To aid in preventing relative movement between the piston 12 and the shaft 11, the nut 24 is rotated in a reverse direction (relative to assembling), moving the nut 24 in the direction 40 away from the piston 12 to thereby compress the clip 27, and therefore also compresses the clip 26, between opposing surfaces on the piston 12 and shaft 11, and nut 24 and shaft 11.

Preferably, the piston 12 has a threaded radial passage 31 that receives a threaded member (grub screw) 32 that engages the threaded portion 37 of the nut 24 to prevent rotation of the nut 24 relative to the piston 12, once the nut 24 is installed.

The groove 22 is provided by inclined surfaces 33 that are inclined by an angle 34 of approximately 90°.

The groove 23 is provided by inclined surfaces 35 that are inclined by an angle 36 of approximately 90°.

The above described preferred embodiment, when being disassembled, merely requires a wire hook to engage with the clips 26 and 27 to resiliently deform the clips 26 and 27 so that they may be removed from the position between the shaft 11 and piston 12, and shaft 11 and nut 24.

The above described preferred embodiment has a number of advantages including ease of assembly and disassembly, while maintaining the piston 12 at a correct location, while inhibiting relative movement between the piston 12 and shaft 11.

The invention claimed is:

1. An assembly including:
   a shaft having a longitudinal axis, a circular transverse cross-section, and having a longitudinal extending outer peripheral surface;
   a piston having a longitudinal through passage, through which the shaft passes, so as to have an internal surface surrounding the shaft, the internal surface being stepped so as to have a first length adjacent the shaft and a second longitudinal length spaced from the shaft, the second longitudinal length being threaded;
   a nut, through which the shaft extends, threadingly engaged with the second longitudinal length; and wherein
   the first shaft length and the shaft have adjacent annular grooves, and the nut and the shaft have adjacent angular grooves, with the assembly including a first clip in the adjacent grooves of the first length and shaft, and a resilient clip in the adjacent grooves of the nut and the shaft, the clips aiding in retaining the shaft fixed to the piston.

2. The assembly of claim 1, further including a seal extending between the first length and shaft.

3. The assembly of claim 1, wherein the clips are spring clips.

4. The assembly of claim 1, wherein a threaded member engages the nut and piston to prevent relative movement therebetween.

5. The assembly of claim 1, wherein the piston has an outer annular groove to receive a seal to engage an outer cylindrical surface.

6. The assembly of claim 2, wherein the clips are spring clips.

7. The assembly of claim 2, wherein a threaded member engages the nut and piston to prevent relative movement therebetween.

8. The assembly of claim 2, wherein the piston has an outer annular groove to receive a seal to engage an outer cylindrical surface.

9. The assembly of claim 3, wherein a threaded member engages the nut and piston to prevent relative movement therebetween.

10. The assembly of claim 3, wherein the piston has an outer annular groove to receive a seal to engage an outer cylindrical surface.

11. The assembly of claim 4, wherein the piston has an outer annular groove to receive a seal to engage an outer cylindrical surface.

12. A steering rack piston assembly including:
   a shaft having a longitudinal axis, a circular transverse cross-section, and having a longitudinal extending outer peripheral surface;
   a piston having a longitudinal through passage, through which the shaft passes, so as to have an internal surface surrounding the shaft, the internal surface being stepped so as to have a first length adjacent the shaft and a second longitudinal length spaced from the shaft, the second longitudinal length being threaded;
   a nut, through which the shaft extends, threadingly engaged with the second longitudinal length; and wherein
   the first shaft length and the shaft have adjacent annular grooves, and the nut and the shaft have adjacent angular grooves, with the assembly including a first clip in the adjacent grooves of the first length and shaft, and a resilient clip in the adjacent grooves of the nut and the shaft, the clips aiding in retaining the shaft fixed to the piston.

* * * * *